United States Patent

Wu

Patent Number: 5,471,855
Date of Patent: Dec. 5, 1995

[54] FOLDING COLLAPSIBLE STEERING LOCK

[76] Inventor: Shwu-Huey Wu, 7F, No. 153-3, Yen Chi Street, Taipei, Taiwan

[21] Appl. No.: 297,853

[22] Filed: Aug. 30, 1994

[51] Int. Cl.⁶ ................................................ B60R 25/02
[52] U.S. Cl. .................................... 70/209; 70/226; 70/238
[58] Field of Search ........................... 70/202, 209–212, 70/225, 226, 237, 238, 14, 18, 19

[56] References Cited

U.S. PATENT DOCUMENTS

| | | | |
|---|---|---|---|
| 3,462,982 | 8/1969 | Moore | 70/209 |
| 4,825,671 | 5/1989 | Wu | 70/202 X |
| 4,835,999 | 6/1989 | Chant | 70/238 |
| 5,092,146 | 3/1992 | Wang | 70/209 |
| 5,131,245 | 7/1992 | Chen | 70/209 |
| 5,157,951 | 10/1992 | Chen et al. | 70/209 |
| 5,230,232 | 7/1993 | Yang | 70/209 |
| 5,329,793 | 7/1994 | Chen | 70/209 |
| 5,333,478 | 8/1994 | Chuang | 70/209 |
| 5,363,679 | 11/1994 | Prasad | 70/209 |

*Primary Examiner*—Steven N. Meyers
*Assistant Examiner*—Suzanne L. Dino
*Attorney, Agent, or Firm*—Bacon & Thomas

[57] ABSTRACT

A folding collapsible steering lock including a retainer bar having a fork at one end for stopping against the steering wheel at one side and a coupling portion at an opposite end, a stop bar having one end pivotably connected to the coupling portion of the retainer bar by a hinge and an opposite end covered with a cap for stopping against the inside of the motor vehicle, and a lock bar moved between a locking position to hold the retainer bar and said stop bar longitudinally aligned and an unlocking position to let the retainer bar and the stop bar be folded up.

3 Claims, 4 Drawing Sheets

FOLDING COLLAPSIBLE STEERING LOCK

BACKGROUND OF THE INVENTION (a) Field of the Invention

The present invention relates to a steering lock for locking the steering wheel of a motor vehicle, and relates more particularly to a folding collapsible steering lock which can be folded up when not in use.

(b) Description of the Prior Art

Various steering locks are well known and intensively used for locking motor vehicles. These steering locks are commonly comprised of two bars moved relative to each other and a lock cylinder on one bar for locking the bars from moving relative to each other. Because these steering locks are not foldable, they need much storage space when not in use. Furthermore, these steering locks are not convenient to carry and the lock cylinder may be damaged easily because the two bars will turn relative to each other when unlocked. U.S. Pat. No. 5,157,951 discloses a steering lock comprising a lock bar having one end pivotably secured to an U-shaped plate at a hooked end of an actuating bar and an opposite end attached with a forked stop bar through screw joint. The lock bar is locked in line with the actuating bar by a lock cylinder in the U-shaped plate when the forked end of the forked stop bar and the hooked end of the actuating bar are respectively stopped at the periphery of a steering wheel at two opposite locations. This structure of steering lock can be folded up when not in use, however it is not safe in use because the connecting elements which connect the lock bar and the actuating bar pivotably together are exposed to the outside and can be destroyed easily by force.

SUMMARY OF THE INVENTION

The present invention has been accomplished to provide a folding collapsible steering lock which eliminates the aforesaid drawbacks. According to one aspect of the present invention, the folding collapsible steering lock comprises a retainer bar having a fork at one end for stopping against the steering wheel at one side and a coupling portion at an opposite end, a stop bar having one end pivotably connected to the coupling portion of the retainer bar by a hinge and an opposite end covered with a cap for stopping against the inside of the motor vehicle, and a lock bar moved between a locking position to hold the retainer bar and said stop bar longitudinally aligned and an unlocking position to let the retainer bar and the stop bar be folded up. According to another aspect of the present invention, the lock bar has a guide rod on the inside at one end moved along a longitudinal guide groove on the retainer bar to stop the lock bar from rotary motion relative to the retainer bar.

DETAILED DESCRIPTION OF THE PREFERRED EMBODIMENT

Figure 1:
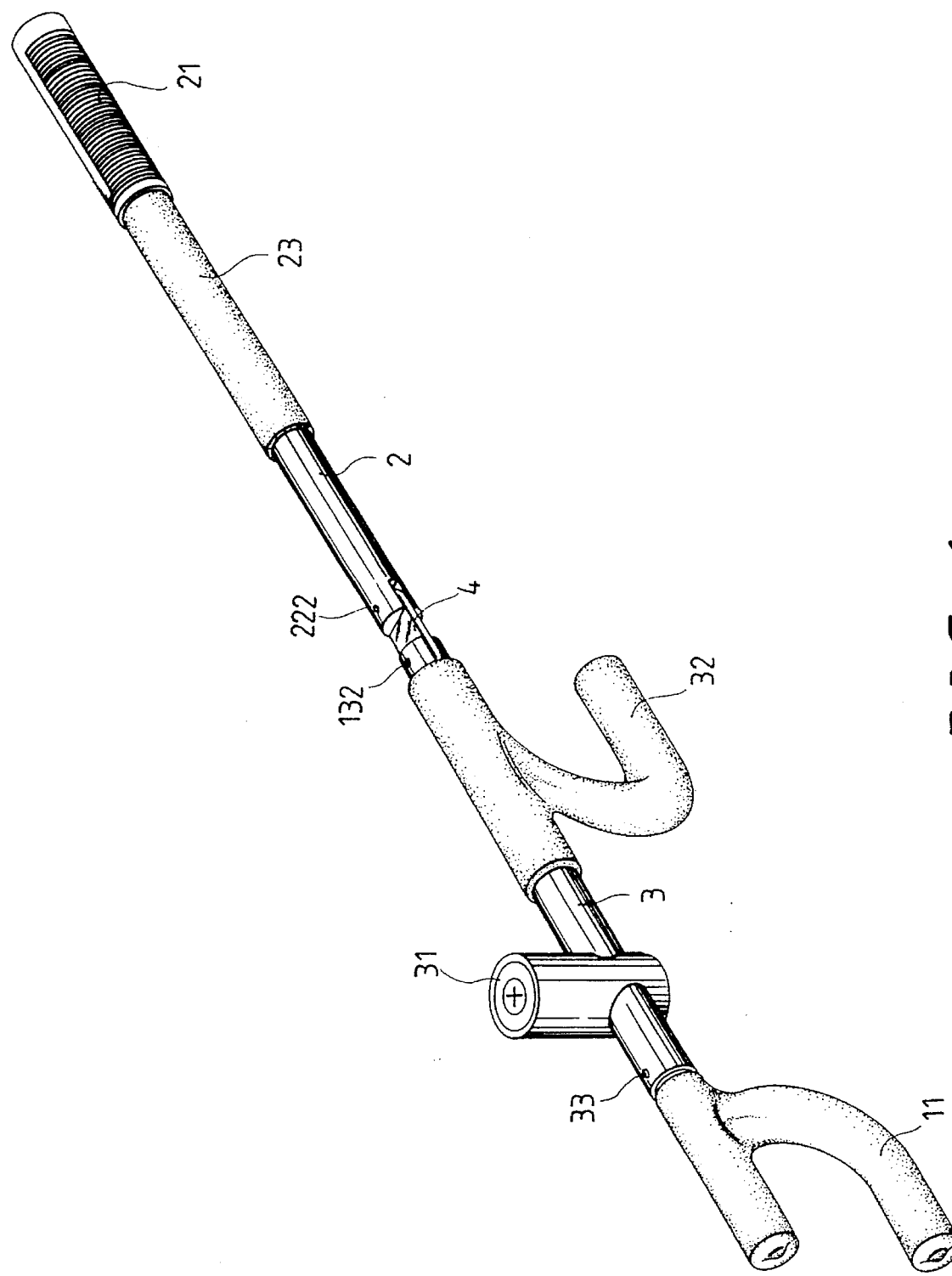
FIG. 1 is an elevational view of a folding collapsible steering lock according to the present invention.
Figure 2:
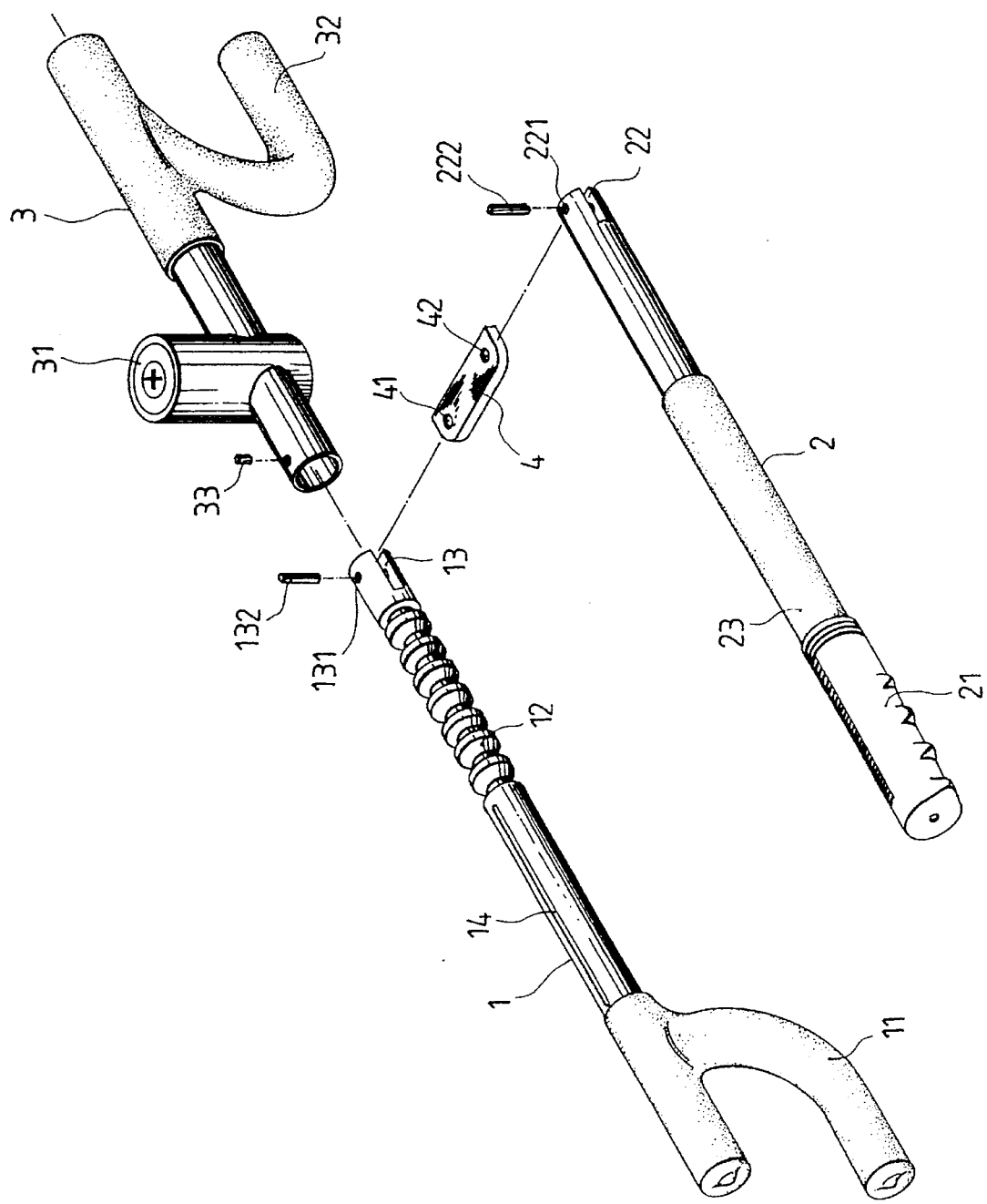
FIG. 2 is an exploded view of the folding collapsible steering lock shown in FIG. 1.

Referring to FIGS. 1 and 2, a folding collapsible steering lock in accordance with the present invention is generally comprised of a retainer bar 1, a stop bar 2, and a lock bar 3.

The retainer bar 1 comprises a fork 11 at one end, a slotted coupling portion 13 at an opposite end, two pin holes 131 aligned on the slotted coupling portion 13, a series of annular grooves 12 adjacent to the slotted coupling portion 13, and a longitudinal guide groove 14 between the annular grooves 12 and the fork 11. The stop bar 2 has one end terminating in a slotted coupling portion 13 and an opposite end covered with a protective cap 21. Two pin holes 221 are aligned on the slotted coupling portion 13 of the stop bar 2. A sleeve 2 is mounted around the stop bar 2 adjacent to the protective cap 21. The slotted coupling portion 13 of the retainer bar 1 is connected to the slotted coupling portion 22 of the stop bar 2 by a connecting plate 4. The connecting plate 4 has a first through hole 41 at one end connected to the slotted coupling portion 13 of the retainer bar 1 between the pin holes 131 by a pivot pin 132, and a second through hole 42 at an opposite end connected to the slotted coupling portion 22 of the stop bar 2 between the pin holes 221 by a pivot pin 222. The lock bar 3 is made from a tube sleeved onto the retainer bar 1 and stopped at the fork 11 before the connection of the stop bar 2 to the retainer bar 1, having a guide rod 33 on the inside moved along the longitudinal guide groove 14 of the retainer bar 1, a fork 32 at an opposite end, and a lock cylinder 31 between the guide rod 33 and the fork 32. When assembled, the lock bar 3 can be moved on the retainer bar 1 and the stop bar 2 between the fork 11 and the sleeve 23. Because the guide rod 33 of the lock bar 3 is moved along the longitudinal guide groove 14, the lock bar 3 is prohibited from rotary motion relative to the retainer bar 1.

Figure 3:
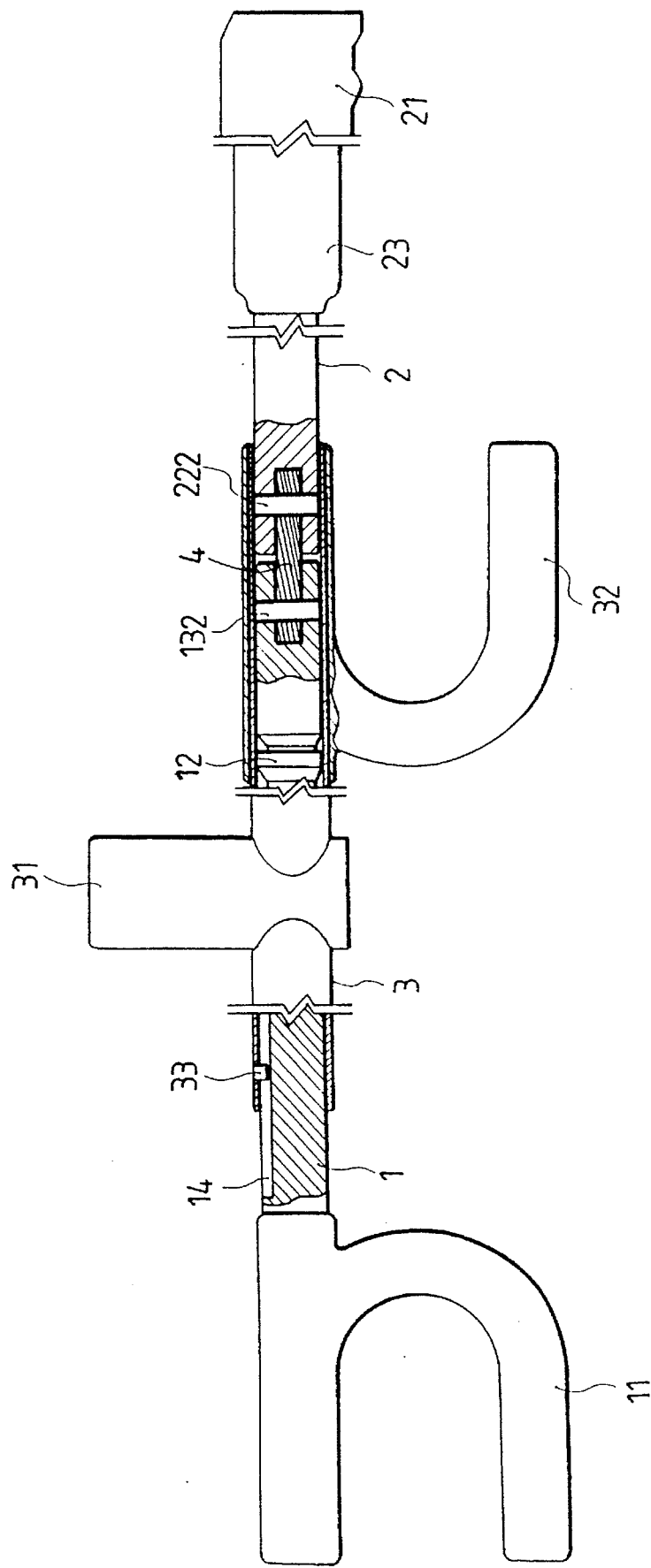
FIG. 3 is a longitudinal view in section of the folding collapsible steering lock shown in FIG. 1.

Referring to FIG. 3 and FIG. 2 again, when the retainer bar 1 and the stop bar 2 are longitudinally aligned, the fork 11 of the retainer bar 1 is stopped against the periphery of the steering wheel (not shown) at one side, then the lock bar 3 is moved along the retainer bar 1 to stop the fork 32 against the steering wheel at an opposite side permitting the slotted coupling portions 13 and 22 to be received inside the lock bar 3 and permitting the stop bar 2 to stop against the inside of the motor vehicle, and then the cylinder lock 31 is locked by turning the lock bolt (not shown) thereof into the annular grooves 12 on the retainer bar 1 to stop the lock bar 3 from axial movement relative to the retainer bar 1.

Figure 4:
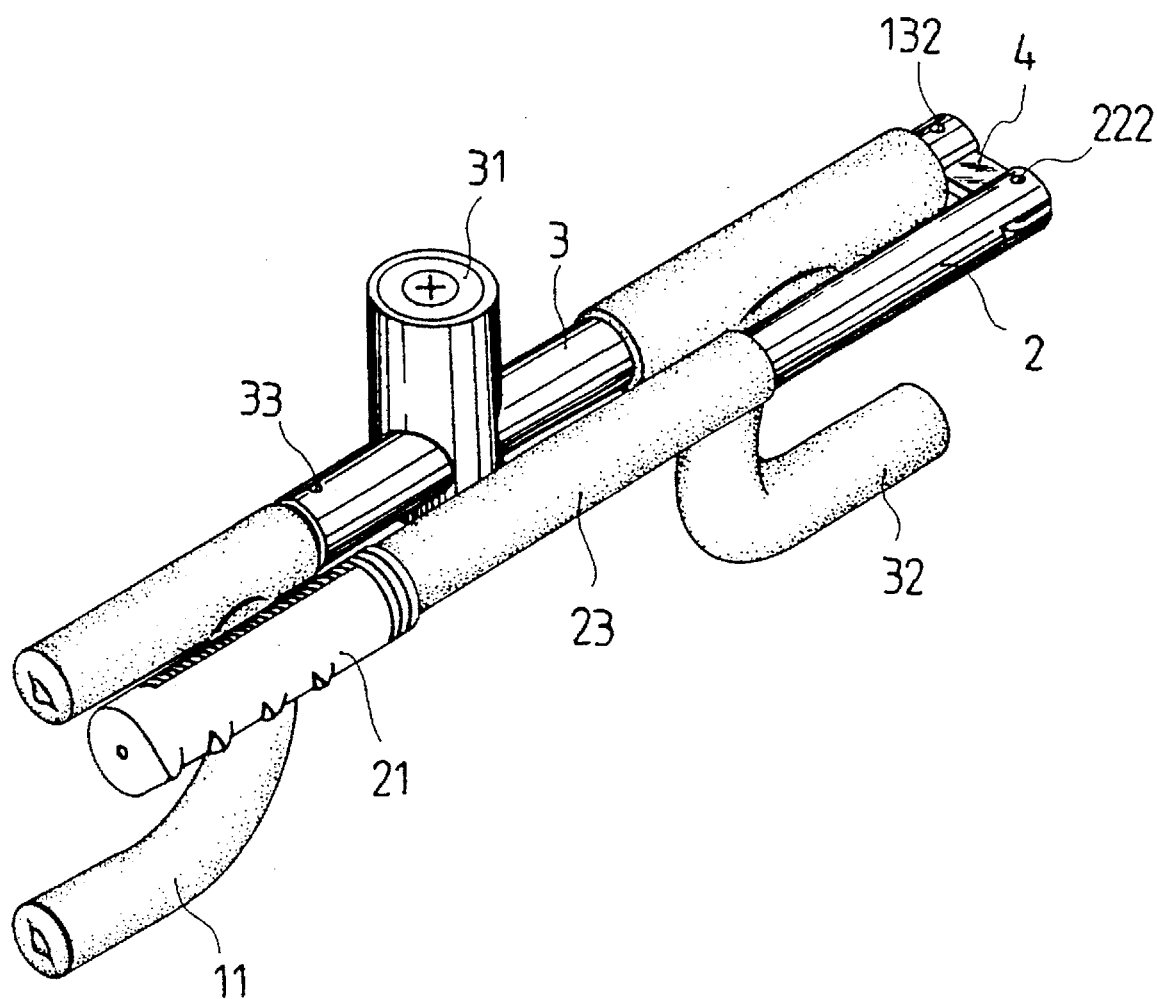
FIG. 4 shows the folding collapsible steering lock of FIG. 1 collapsed.

Referring to FIG. 4, when the steering lock is not in use, the lock cylinder 31 is unlocked and then the lock bar 3 is moved along the longitudinal guide groove 14 and stopped at the fork 11, and therefore the retainer bar 1 and the stop bar 2 can be folded up into the collapsed position.

What is claimed is:

1. A folding collapsible steering lock comprising:

a retainer bar having a fork at one end for stopping a steering wheel of a motor vehicle at one side, a slotted coupling portion at an opposite end, a series of annular gooves adjacent to the slotted coupling portion of said retainer bar, and a longitudinal guide groove between said annular grooves and the fork of said retainer bar;

a stop bar having one end terminating in a slotted coupling portion and an opposite end covered with a protective cap for stopping against the inside of the motor vehicle to stop the steering wheel from turning;

a connecting plate having one end pivotably connected to the slotted coupling portion of said retainer bar by a pivot pin and an opposite end pivotably connected to the slotted coupling portion of said stop bar by a pivot pin; and a lock bar sleeved onto said retainer bar and moved between a locking position to hold said retainer bar and said stop bar longitudinally aligned and an unlocking position to let said retainer bar and said stop bar be folded up, said lock bar having a fork at one end for stopping against the steering wheel at an opposite side and a lock cylinder at an opposite end operated by a key to move a lock bolt thereof into said annular grooves to lock the steering lock in said locking position.

2. The folding collapsible steering lock of claim 1 wherein said lock bar further comprises a guide rod located so as to engage and move along said longitudinal guide groove between the fork of said retainer bar and said annular grooves for guiding longitudinal movement of said lock bar on said retainer bar.

3. The folding collapsible steering lock of claim 1 wherein said stop bar is covered with a sleeve abutted to said protective cap to limit the movement of said lock bar on said retainer bar and said stop bar at one end.

* * * * *